US009383978B2

(12) United States Patent
Seo et al.

(10) Patent No.: US 9,383,978 B2
(45) Date of Patent: Jul. 5, 2016

(54) APPARATUS AND METHOD FOR ON-DEMAND OPTIMIZATION OF APPLICATIONS

(75) Inventors: Sun-Ae Seo, Seoul (KR); Byung-Chang Cha, Gimpo-si (KR); Dae-Hyun Cho, Suwon-si (KR); Sung-do Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 993 days.

(21) Appl. No.: 12/959,852

(22) Filed: Dec. 3, 2010

(65) Prior Publication Data

US 2011/0231813 A1    Sep. 22, 2011

(30) Foreign Application Priority Data

Mar. 19, 2010    (KR) .................. 10-2010-0024850

(51) Int. Cl.
  *G06F 9/45*    (2006.01)
  *G06F 9/44*    (2006.01)
  *G06F 11/36*    (2006.01)

(52) U.S. Cl.
  CPC  *G06F 8/443* (2013.01); *G06F 8/30* (2013.01); *G06F 11/3612* (2013.01)

(58) Field of Classification Search
  CPC ... G06F 8/443–8/447; G06F 8/76; G06F 8/30
  USPC .......................... 717/101–178; 709/201–253
  See application file for complete search history.

(56) References Cited

U.S. PATENT DOCUMENTS

| | | | |
|---|---|---|---|
| 5,555,416 A * | 9/1996 | Owens et al. .................. 717/178 |
| 6,226,784 B1 * | 5/2001 | Holmes et al. ................. 717/100 |
| 6,279,030 B1 * | 8/2001 | Britton ................ G06F 9/44521<br>707/999.01 |
| 6,523,166 B1 * | 2/2003 | Mishra et al. .................. 717/174 |
| 6,851,106 B1 * | 2/2005 | Narisawa ................... G06F 8/24<br>717/108 |
| 7,069,541 B2 * | 6/2006 | Dougherty et al. ........... 717/122 |
| 7,080,159 B2 | 7/2006 | Chu et al. |
| 7,107,279 B2 * | 9/2006 | Pociu |
| 7,434,213 B1 * | 10/2008 | Prakash et al. ................ 717/152 |
| 7,493,610 B1 * | 2/2009 | Onodera ................... G06F 8/49<br>714/38.14 |
| 7,529,888 B2 | 5/2009 | Chen et al. |
| 7,546,595 B1 * | 6/2009 | Wickham et al. ............. 717/168 |

(Continued)

FOREIGN PATENT DOCUMENTS

| | | |
|---|---|---|
| JP | 2002-236592 | 8/2002 |
| JP | 2003-242107 | 8/2003 |

(Continued)

OTHER PUBLICATIONS

Generating Optimized Code from SCR Specifications—Tom Rothamel, Yanhong A. Liu—Stony Brook University; Constance L. Heitmeyer, Elizabeth I. Leonard—Naval Research Laboratory—LCTES'06 Jun. 14-16, 2006, Ottawa, Ontario, Canada.*

(Continued)

*Primary Examiner* — Francisco Aponte
(74) *Attorney, Agent, or Firm* — NSIP Law

(57) ABSTRACT

An apparatus and method for optimizing an application to be executed in an execution environment of a client are provided. For example, on-demand optimizing of the performance of applications may be performed such that the applications are suitable for execution environments of various types of Consumer Electronic (CE) equipment, in order to distribute high performance applications.

11 Claims, 6 Drawing Sheets

(56) References Cited

U.S. PATENT DOCUMENTS

| | | | | |
|---|---|---|---|---|
| 7,730,469 B1* | 6/2010 | Boucher | | 717/151 |
| 7,797,403 B2* | 9/2010 | Vedula et al. | | 709/220 |
| 7,797,690 B2* | 9/2010 | Nesbitt | G06F 8/443 | 717/153 |
| 7,890,951 B2* | 2/2011 | Vinberg et al. | | 717/174 |
| 7,904,879 B2* | 3/2011 | Sowa | G06F 8/65 | 717/106 |
| 7,966,610 B2* | 6/2011 | Lin | G06F 8/34 | 717/152 |
| 7,975,256 B2* | 7/2011 | Atkin | G06F 8/443 | 717/122 |
| 8,180,964 B1* | 5/2012 | Koh et al. | | 711/118 |
| 8,225,289 B2* | 7/2012 | Burton | | 717/124 |
| 8,230,417 B1* | 7/2012 | Clark et al. | | 717/174 |
| 8,490,084 B1* | 7/2013 | Alford et al. | | 717/177 |
| 8,615,747 B2* | 12/2013 | Beretta | | 717/151 |
| 2002/0066088 A1* | 5/2002 | Canut et al. | | 717/151 |
| 2003/0023559 A1* | 1/2003 | Choi et al. | | 705/51 |
| 2003/0066060 A1* | 4/2003 | Ford | | 717/158 |
| 2004/0015832 A1* | 1/2004 | Stapp et al. | | 717/106 |
| 2004/0064809 A1* | 4/2004 | Liu et al. | | 717/158 |
| 2004/0073904 A1* | 4/2004 | Hill | | 718/1 |
| 2004/0117779 A1* | 6/2004 | Lagergren | | 717/153 |
| 2004/0216085 A1* | 10/2004 | Wilson | G06F 8/24 | 717/108 |
| 2005/0108687 A1* | 5/2005 | Mountain et al. | | 717/127 |
| 2006/0005177 A1* | 1/2006 | Atkin et al. | | 717/151 |
| 2006/0080658 A1* | 4/2006 | Marion et al. | | 717/177 |
| 2006/0130056 A1* | 6/2006 | Bozak et al. | | 717/174 |
| 2006/0136889 A1* | 6/2006 | Han et al. | | 717/162 |
| 2007/0016888 A1* | 1/2007 | Webb | | 717/106 |
| 2007/0094641 A1* | 4/2007 | Darr | G06F 8/10 | 717/121 |
| 2007/0198973 A1* | 8/2007 | Choi et al. | | 717/151 |
| 2007/0219944 A1* | 9/2007 | Liu et al. | | 707/2 |
| 2008/0034355 A1* | 2/2008 | Shen et al. | | 717/148 |
| 2008/0098385 A1* | 4/2008 | Alger et al. | | 717/174 |
| 2008/0222608 A1* | 9/2008 | Gartner et al. | | 717/124 |
| 2008/0271004 A1* | 10/2008 | Choi et al. | | 717/151 |
| 2009/0249284 A1* | 10/2009 | Antosz et al. | | 717/104 |
| 2009/0307670 A1* | 12/2009 | Kashyap et al. | | 717/135 |
| 2010/0146487 A1* | 6/2010 | Chun et al. | | 717/126 |
| 2010/0251227 A1* | 9/2010 | Arayasantiparb et al. | | 717/151 |

FOREIGN PATENT DOCUMENTS

| | | |
|---|---|---|
| KR | 10-2004-0007324 | 1/2004 |
| KR | 10-2007-0052335 | 5/2007 |
| KR | 10-2007-0097819 | 10/2007 |
| KR | 10-2009-0000123 | 1/2009 |
| WO | WO 2007/111487 | 10/2007 |
| WO | 2008/082022 | 7/2008 |
| WO | WO 2008/082022 | 7/2008 |

OTHER PUBLICATIONS

Annotation-Based Empirical Performance Tuning Using Orio—Albert Hartono, P. Sadayappan—Dept. of Computer Science and Engg; Ohio State University—Boyana Norris; Mathematics and Computer Science Division—Argonne National Laboratory Argonne, Illinois—Parallel & Distributed Processing, 2009. IPDPS 2009. IEEE International Symposium-Rome.*

Code Generation for Multiple Mappings—Wayne Kelly, William Pugh, Evan Rosser—Department of Computer Science University of Maryland, College Park, MD—1995 IEEE.*

Korean Office Action issued on Dec. 18, 2015 in counterpart Korean Application No. 10-2010-0024850 (19 pages in Korean with English translation).

* cited by examiner

APPARATUS AND METHOD FOR ON-DEMAND OPTIMIZATION OF APPLICATIONS

CROSS-REFERENCE TO RELATED APPLICATION

This application claims the benefit under 35 U.S.C. §119(a) of Korean Patent Application No. 10-2010-0024850, filed on Mar. 19, 2010, the entire disclosure of which is incorporated herein by reference for all purposes.

BACKGROUND

1. Field

The following description relates to an apparatus and method for distributing high performance software, and more particularly, to an apparatus and method for optimizing, on-demand, the performance of applications provided by software developers such that the applications are suitable for execution in execution environments of a variety of types of Consumer Electronic (CE) equipment.

2. Description of the Related Art

Following an increase in the numbers of computer programmers, personal software developers as well as existing software providers are developing programs to meet consumer demands.

Various programs made by software developers are distributed to be used in various types of Consumer Electronic (CE) equipment, such as TVs, mobile phones, MP3 players, and the like. However, there are difficulties in distributing a program in a form to be suitable to various types of CE equipment that use different execution environments. For performance improvement of CE equipment including multi-core processors, applications have to be changed according to a hardware architecture in order to satisfy parallelism, and the like, of application codes.

It is rather inefficient to generate applications requiring higher performance such that the applications are only executable in a limited amount of heterogeneous terminal types. Also, there are limitations to software developers changing applications in consideration of the execution environments of individual clients. Accordingly, a technique for optimizing applications to be executed in the execution environments of individual clients and distributing the optimized applications is desirable for a high performance/high efficiency-oriented CE environment.

SUMMARY

In one general aspect, there is provided a terminal-adaptive application optimization apparatus comprising an interface to receive information about an execution environment and requirements, of a terminal, from the terminal, and to transmit an application code to the terminal, a code generator to create the application code based on the execution environment and the requirements, of the terminal, and a performance verifying unit to execute the application code in the execution environment to determine whether the performance of the application code satisfies the requirements of the terminal.

The execution environment of the terminal may include a hardware specification, an operating system, an available library, and input data information, of the terminal.

The requirements of the terminal may include a processing speed, a memory capacity, a time limit for optimization, the number of tuning parameters, and information for designating a specific tuning parameter.

The code generator may generate the application code as an Intermediate Representation (IR) code or a native code.

The performance verifying unit may comprise a code execution unit to execute the created application code in the execution environment of the terminal, and a performance comparator to determine whether the performance of the executed application code satisfies the requirements of the terminal.

The performance verifying unit may cause the terminal to directly execute the application code in order to determine whether the performance of the application code satisfies the requirements of the terminal.

The terminal-adaptive application optimization apparatus may further comprise a tuning parameter generator to generate a tuning parameter for generating a new application code that satisfies the requirements of the terminal, when it is determined that the performance of the application code does not satisfy the requirements of the terminal.

The terminal-adaptive application optimization apparatus may further comprise a code storage to map the terminal to the application code and to store the result of the mapping, when the performance verifying unit determines that the performance of the application code satisfies the requirements of the terminal.

In another aspect, there is provided a terminal-adaptive application optimization method comprising receiving information about an execution environment and requirements, of a terminal, from the terminal, creating an application code based on the execution environment and requirements, of the terminal, executing the created application code in the execution environment, and determining whether the performance of the executed application code satisfies the requirements of the terminal.

The terminal-adaptive application optimization method may further comprise generating a tuning parameter for generating a new application code that satisfies the requirements of the terminal, when it is determined that the performance of the application code does not satisfy the requirements of the terminal.

In another aspect, there is provided a terminal-adaptive application optimization method comprising receiving information about an execution environment and requirements, of a terminal, from the terminal, creating an application code based on the execution environment and requirements, of the terminal, and inserting an instrument code for performance verification into the application code, executing the created application code in the execution environment and creating a profile for the performance of the application code, and using the profile to convert the application code into a new application code suitable to be executed in the execution environment and that satisfies the requirements of the terminal.

The terminal-adaptive application optimization method may further comprise causing the terminal to directly execute the application code and generating a profile for performance of the application code.

In another aspect, there is provided a terminal-adaptive application optimization method comprising receiving information about an execution environment and requirements, of a terminal, from the terminal, generating a tuning parameter for generating an application code based on the execution environment and the requirements, of the terminal, creating an application code based on the tuning parameter, executing the application code in the execution environment, and determining whether the performance of the created application code satisfies the requirements of the terminal.

The terminal-adaptive application optimization method may further comprise generating one or more tuning parameters for generating application codes based on the execution environment and the requirements, of the terminal, generating one or more application codes based on the one or more tuning parameters, and comparing the performances of the one or more application codes to each other to select an application code that satisfies the requirements of the terminal, from among the one or more application codes.

The generating one or more application codes may comprise generating a plurality of application codes, and the comparing may comprise selecting an optimal application code from among the plurality of application codes based on the respective performances of the plurality of application codes.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
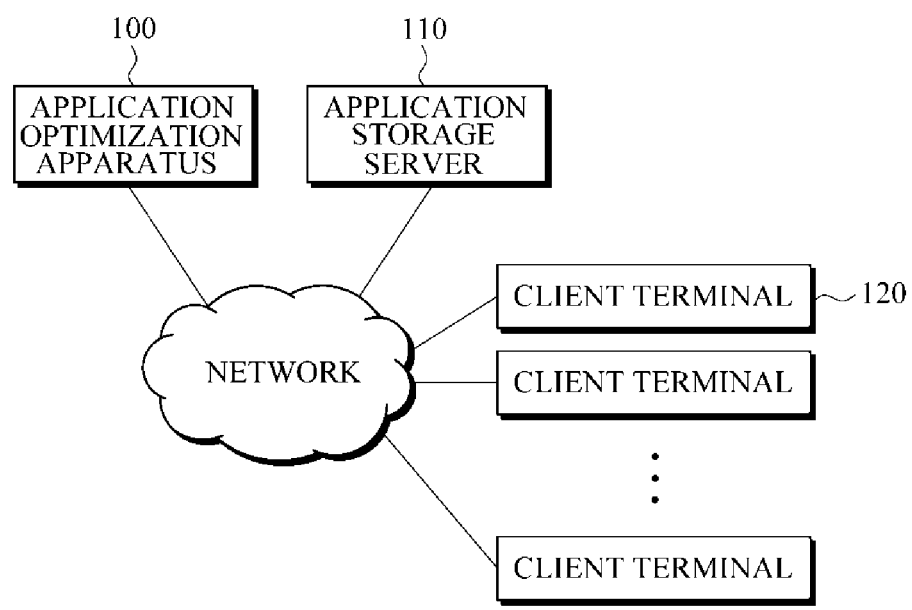
FIG. 1 is a diagram illustrating an example of a system for application optimization.

FIG. 1 illustrates an example of a system for application optimization.

Referring to FIG. 1, in this example the system for application optimization includes an application optimization apparatus 100, an application storage server 110, and a terminal 120.

The application optimization apparatus 100, the application storage server 110, and the terminal 120 are connected to each other through a network. When the terminal 120 requests optimization of a certain application to the application optimization apparatus 100, the application optimization apparatus 100 may receive information about an execution environment and requirements of the terminal 120 from the terminal 120, and the application optimization apparatus 100 may perform application optimization based on the received information.

In this example, the application may be transmitted from the application storage server 110 or the terminal 120.

For example, the execution environment may include a hardware specification, an operating system, an available library, input data information, and the like, of the terminal 120. For example, the requirements may include a processing speed, a memory capacity, a time limit for optimization, the number of tuning parameters, information for designating tuning parameters, and the like. The tuning parameters may include information about where the application codes are to be modified and how the application codes are to be modified based on the execution environment and/or the requirements of the terminal 120.

Figure 2:
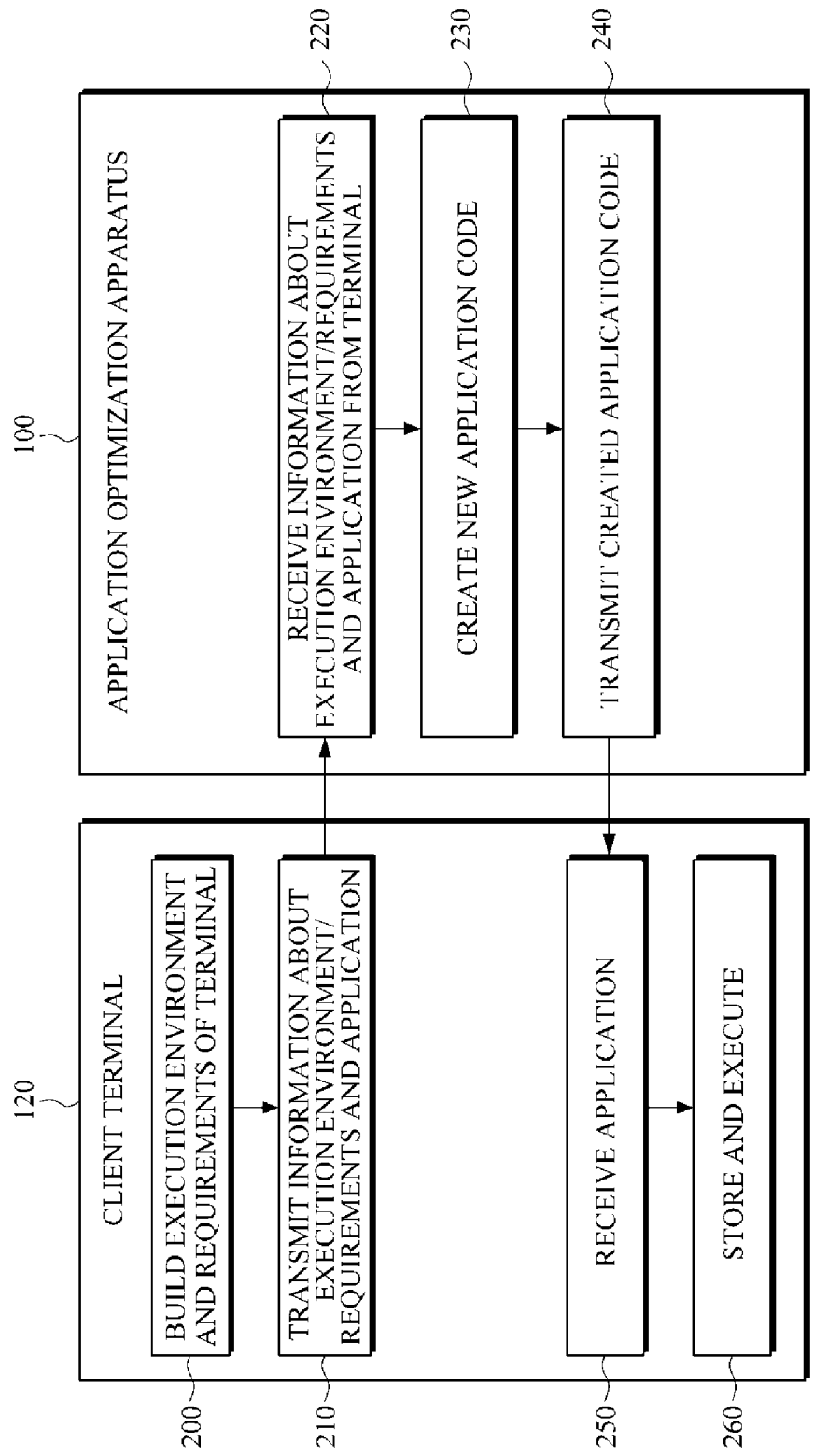
FIG. 2 is a diagram illustrating an example of a process for application optimization between a terminal and an application optimization apparatus.

FIG. 2 illustrates an example of a process for application optimization between a terminal and an application optimization apparatus.

In this example, the terminal 120 builds an execution environment based on the specifications of devices included therein and requirements for performance of applications to be executed, in 200, and transmits, in 210, the execution environment, requirements, and applications to the application optimization apparatus 100. In this example, the applications to be executed may be transmitted from an application storage sever to the terminal 120, based on a request from the terminal 120.

The application optimization apparatus 100 receives information about the execution environment, requirements, and applications from the terminal 120, in 220, and considers the execution environment and requirements to generate a new application code that can be executed in the terminal 120 while optimally satisfying the requirements of the terminal 120, in 230. In 240, the application optimization apparatus 100 transmits the new application code to the terminal 120. In this example, the application optimization apparatus 100 may use its own engines, such as an IR-to-native compiler, a virtual machine, a client device simulation, and the like, to convert the application code. In 250, the terminal 120 receives the new application code, and, in 260, the terminal 120 stores and executes the new application code. The application optimization apparatus 100 may perform simulations on the converted application code under the same execution environment as the terminal 120. Accordingly, the application optimization apparatus 100 may determine whether performance satisfies the requirements of the terminal 120. Alternatively, the terminal 120 itself may perform performance verification on the converted application code.

Figure 3:
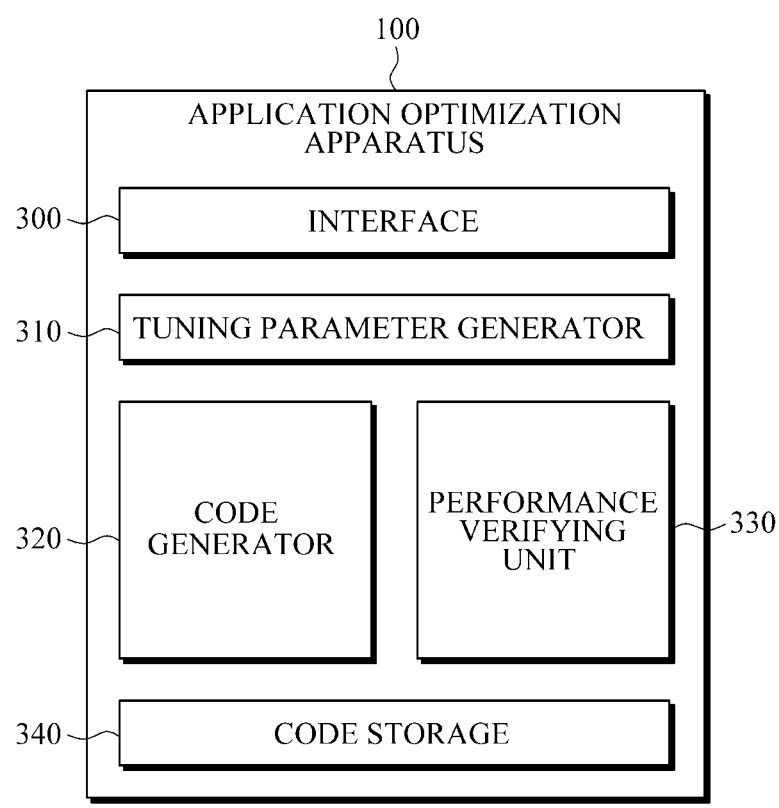
FIG. 3 is a diagram illustrating an example of an application optimization apparatus that is shown in FIG. 1.

FIG. 3 illustrates an example of the application optimization apparatus 100 that is shown in FIG. 1.

Referring to FIG. 3, the application optimization apparatus 100 includes an interface 300, a tuning parameter generator 310, a code generator 320, a performance verifying unit 330, and a code storage 340.

The interface 300 may receive information about the execution environment and the requirements of a terminal from the terminal and transfers an application code that is generated by the application optimization apparatus 100 to the terminal.

The code generator 320 may generate an application code, for example, an application code that is most suitable to satisfy the requirements of the execution environment of the terminal.

The performance verifying unit 330 may execute the application code in the execution environment of the terminal to determine whether the performance of the application code satisfies the requirements set forth. For example, the performance verifying unit 330 may simulate the application code through an engine, such as a virtual machine, a client device simulator, and the like, under the same execution environment as that of the client terminal, in order to determine whether the performance of the application code satisfies the requirements of the terminal. Alternatively, the terminal itself may perform performance verification on the application code.

Before the application is subjected to simulations, the application code may be converted into a native code, for example, an IR code, and the like, based on a simulation engine or the terminal.

The performance verifying unit 330 may include a code execution unit and a performance comparator. In this example, the code execution unit may execute the application code generated in the execution environment of the terminal, and the performance comparator may determine whether the performance of the executed application code satisfies the requirements of the terminal.

When the performance verifying unit 330 determines that the performance of the application code does not satisfy the requirements of the terminal, the tuning parameter generator 310 may generate tuning parameters for creating a new application code that satisfies the requirements. For example, the performance of the application code may be verified based on the execution speed of the application code, the amount of memory used by the application code, and the like.

When the performance verifying unit 330 determines that the performance of the application code satisfies the requirements of the terminal, the code storage 340 maps the corresponding terminal to the application code and then stores the result of the mapping therein. In this example, by storing the mapping results of terminals and application codes in the code storage 340, when a terminal requests optimization of an application with the same or different requirements, a stored application code may be quickly generated and provided to optimize the application execution.

Figure 4:
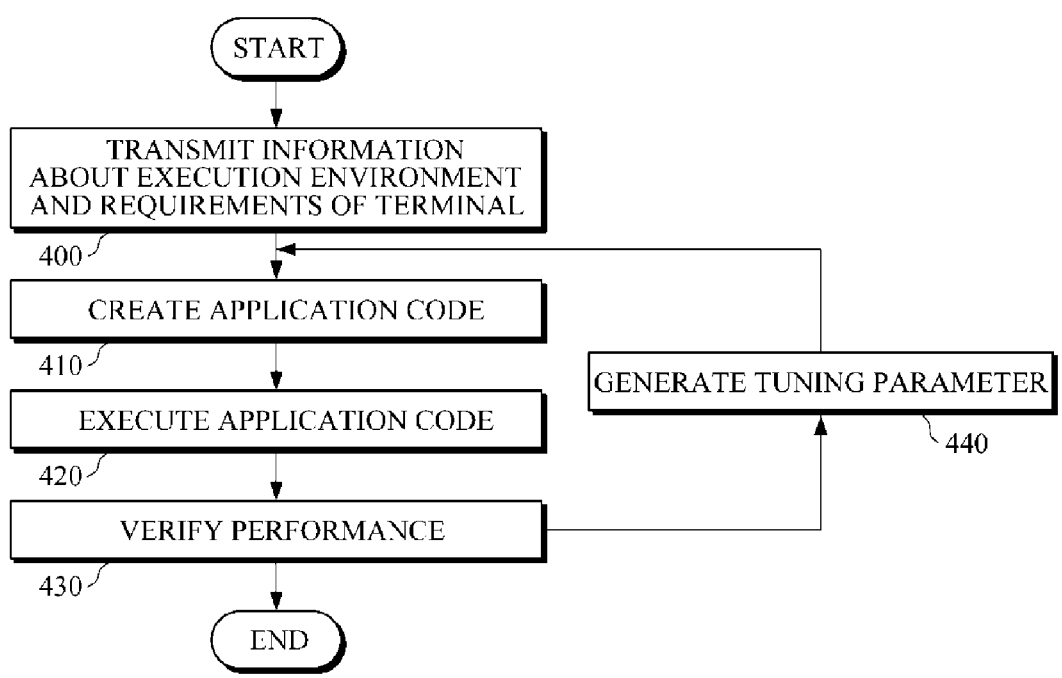
FIG. 4 is a flowchart illustrating an example of an application optimization method.

FIG. 4 illustrates an example of an application optimization method.

Information about an execution environment and requirements of a terminal are received from the terminal, in 400. In 410, an application code is generated based on the execution environment and requirements of the terminal, and the application code is executed under the execution environment, in 420.

In 430, whether the performance of the executed application code satisfies the requirements is determined, and if it is determined that the performance of the application code satisfies the requirements, the application code is transferred to the terminal.

Meanwhile, if it is determined that the performance of the application code does not satisfy the requirements, a tuning parameter for creating a new application code satisfying the requirements is generated in 440 and the process returns to 410 to generate a new application code based on the generated tuning parameter.

Figure 5:
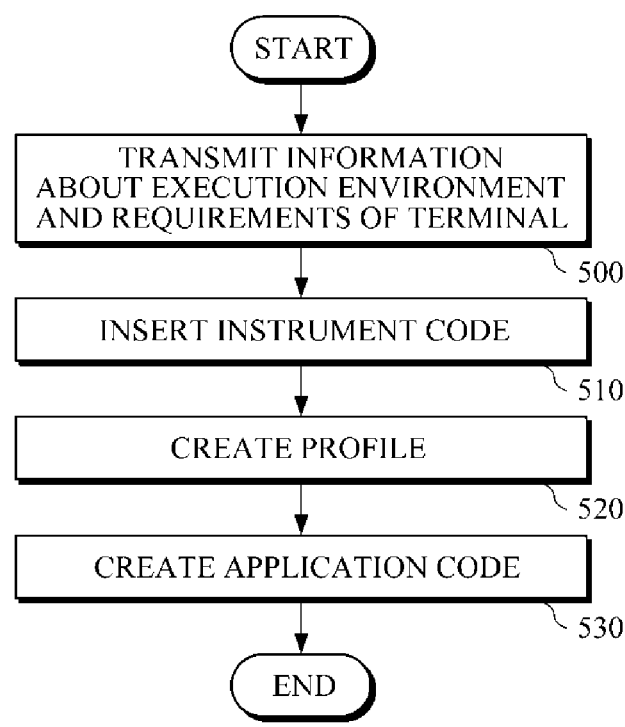
FIG. 5 is a flowchart illustrating another example of an application optimization method.

FIG. 5 illustrates another example of an application optimization method.

The application optimization method may be based on runtime profile information, and may be performed under the assumption that an application can be optimized based on its execution information (profile information) obtained after being executed once.

In 500, information about an execution environment and requirements of a terminal are received from the terminal.

In 510, an application code is generated based on the execution environment and requirements of the terminal and an instrument code for performance verification is inserted into the application code. For example, the application code may be an application IR code.

In 520, the application code is executed in the execution environment to create a profile regarding the performance of the application code. In this example, the application code may be executed with an engine such as a virtual machine or the like, thus creating its profile information.

An instrument code for performance evaluation may be inserted into the application IR code to compile a native code. For example, the native code may be executed directly by a client simulator or by a client terminal according to where the instrument code is executed, thereby creating profile information.

The application code may be executed directly by the terminal to create a profile for the performance of the application code. In 530, the profile is used to convert the application code into an application code that satisfies the execution environment and requirements.

The above-described process may be repeated to create an optimized application code that satisfies the requirements in the execution environment of the terminal.

Figure 6:
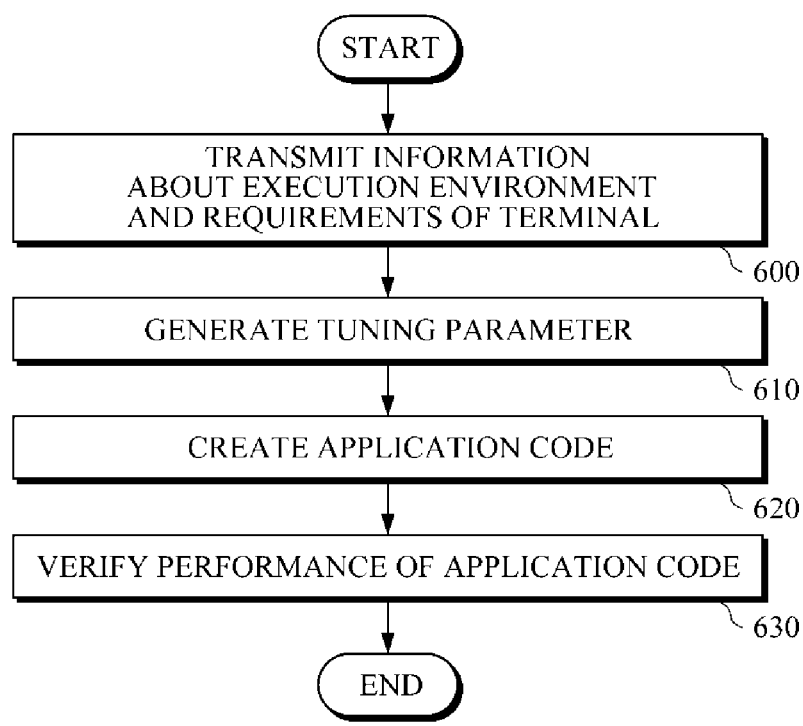
FIG. 6 is a flowchart illustrating another example of an application optimization method.

FIG. 6 illustrates another example of an application optimization method.

In 600, information about an execution environment and requirements of a terminal are received from the terminal.

In 610, a tuning parameter for creating an application code based on the execution environment and requirements is generated. Successively, an application code is created according to the tuning parameter, in 620, and the application code is executed in the execution environment, in 630. Whether the performance of the application code satisfies the requirements is determined, and if it is determined that the performance of the application satisfies the requirements, the application code is transferred to the terminal.

The above-described process (from 610 to 630) may be repeatedly performed to create an optimized application code that satisfies the requirements in the execution environment of the terminal.

In 610, a plurality of application codes may be verified in parallel to find an optimal application code by generating one or more tuning parameters for generating application codes according to the execution environment and requirements of the terminal, creating one or more application codes according to the tuning parameters, and comparing the performances of the application codes with each other to select an application that satisfies the requirements.

The application optimization methods described above with reference to FIGS. 4, 5 and 6 may be implemented individually, in a combined form, and/or sequentially.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal-adaptive application optimization apparatus comprising:
    an interface configured to receive, from a terminal, application optimization requirements and information about an execution environment of the terminal in order to provide an application code that is optimized for the terminal to the terminal, and to transmit the application code to the terminal,
    wherein the application optimization requirements specify a required performance of the application code;
    a code generator configured to create the application code based on the information about the execution environment of the terminal and the application optimization requirements, and insert an instrument code for performance verification into the created application code; a performance verifying unit configured to execute the application code in an execution environment that is the same as the execution environment of the terminal to determine whether a performance of the application code satisfies the application optimization requirements and generate a profile based on the executed application code, wherein the profile comprises information regarding the performance of the executed application code;
    a tuning parameter generator configured to generate a tuning parameter for generating a new application code that satisfies the requirements of the terminal, in response to a determination that the performance of the application code does not satisfy the application optimization requirements; and
    a code storage configured to map the terminal to the application code and to store the result of the mapping, in response to the performance verifying unit determining that the performance of the application code satisfies the requirements of the terminal so that the stored application code is generated and provided to optimize the application execution, when the terminal requests optimization of the application with the same or different requirements.

2. The terminal-adaptive application optimization apparatus of claim 1, wherein the information about the execution environment of the terminal includes a hardware specification, an operating system, an available library, and input data information, of the terminal.

3. The terminal-adaptive application optimization apparatus of claim 1, wherein the application optimization requirements further include a processing speed, a memory capacity, and a time limit for optimization.

4. The terminal-adaptive application optimization apparatus of claim 1, wherein the code generator generates the application code as an Intermediate Representation (IR) code or a native code.

5. The terminal-adaptive application optimization apparatus of claim 1, wherein the performance verifying unit comprises:
    a code execution unit configured to execute the created application code in the execution environment that is the same as the execution environment of the terminal; and
    a performance comparator configured to determine whether the performance of the executed application code satisfies the application optimization requirements.

6. The terminal-adaptive application optimization apparatus of claim 1, wherein the performance verifying unit causes the terminal to directly execute the application code in order to determine whether the performance of the application code satisfies the application optimization requirements.

7. A terminal-adaptive application optimization method comprising:
    receiving, from a terminal, application optimization requirements and information about an execution environment of the terminal in order to provide an application code that is optimized for the terminal to the terminal, wherein the application optimization requirements specify a required performance of the application code;
    creating the application code based on the information about the execution environment of the terminal and the application optimization requirements, and inserting an instrument code for performance verification into the created application code;
    executing the created application code in an execution environment that is the same as the execution environment of the terminal;
    generating a profile based on the executed application code, wherein the profile comprises information regarding the performance of the executed application code;
    using the profile to convert the executed application code into a new application code suitable to be executed in the execution environment and that satisfies the application optimization requirements;
    generating a tuning parameter for generating a new application code that satisfies the application optimization requirements of the terminal, in response to a determination that the performance of the application code does not satisfy the application optimization requirements,
    wherein the tuning parameter includes information about where the application code is to be modified or how the application code is to be modified based on the execution environment or the application optimization requirements; and
    storing a code to map the terminal to the application code and to store the result of the mapping, in response to the performance verifying unit determining that the performance of the application code satisfies the requirements of the terminal so that the stored application code is generated and provided to optimize the application execution, when the terminal requests optimization of the application with the same or different requirements.

8. The terminal-adaptive application optimization method of claim 7, further comprising causing the terminal to directly execute the created application code to generate the profile.

9. A terminal-adaptive application optimization method comprising:
    receiving, from a terminal, application optimization requirements and information about an execution environment of the terminal in order to provide an application code that is optimized for the terminal to the terminal;

generating a tuning parameter for generating the application code based on the information about the execution environment of the terminal and the application optimization requirements;

creating the application code, to which an instrument code for performance verification is inserted, based on the tuning parameter, and inserting, an instrument code for performance verification into the created application code;

executing the created application code in an execution environment that is the same as the execution environment of the terminal;

generating a profile based on the executed application code, wherein the profile comprises information regarding the performance of the executed application code;

determining whether a performance of the created application code satisfies the application optimization requirements based on a result of the execution; and storing a code to map the terminal to the application code and to store the result of the mapping, in response to the performance verifying unit determining that the performance of the application code satisfies the requirements of the terminal so that the stored application code is generated and provided to optimize the application execution, when the terminal requests optimization of the application with the same or different requirements;

wherein the tuning parameters includes information about where the application code is to be modified or how the application code is to be modified based on the execution environment or the application optimization requirements.

10. The terminal-adaptive application optimization method of claim 9, further comprising:

generating one or more tuning parameters for generating application codes based on the information about the execution environment of the terminal and the application optimization requirements;

generating one or more application codes based on the one or more tuning parameters; and comparing the performances of the one or more application codes to each other to select an application code that satisfies the application optimization requirements, from among the one or more application codes.

11. The terminal-adaptive application optimization method of claim 10, wherein the generating one or more application codes comprises generating a plurality of application codes, and the comparing comprises selecting an optimal application code from among the plurality of application codes based on the respective compared performances of the plurality of application codes.

* * * * *